(12) United States Patent
Zierhut et al.

(10) Patent No.: US 8,691,322 B2
(45) Date of Patent: Apr. 8, 2014

(54) MEASUREMENT METHOD AND DEVICE FOR MEASURING LAYER THICKNESSES AS WELL AS PRODUCTION METHOD AND COATING SYSTEM

(75) Inventors: Jochen Zierhut, München (DE); Susanne Hogger, München (DE)

(73) Assignee: MTU Aero Engines GmbH, Munich (DE)

( * ) Notice: Subject to any disclaimer, the term of this patent is extended or adjusted under 35 U.S.C. 154(b) by 0 days.

(21) Appl. No.: 13/468,639

(22) Filed: May 10, 2012

(65) Prior Publication Data

US 2012/0288616 A1 Nov. 15, 2012

(30) Foreign Application Priority Data

May 13, 2011 (DE) .................. 10 2011 101 416

(51) Int. Cl.
*C23C 14/54* (2006.01)

(52) U.S. Cl.
USPC ...... 427/9; 427/8; 427/10; 374/100; 374/141; 374/142; 73/150 R

(58) Field of Classification Search
None
See application file for complete search history.

(56) References Cited

U.S. PATENT DOCUMENTS

| | | | |
|---|---|---|---|
| 6,478,875 B1 | 11/2002 | Sampath et al. | |
| 2005/0033819 A1 | 2/2005 | Gambino et al. | |
| 2005/0137829 A1 | 6/2005 | Gimelfarb et al. | |
| 2006/0228465 A1* | 10/2006 | Zurecki | 427/8 |
| 2006/0246213 A1* | 11/2006 | Moreau et al. | 427/8 |
| 2009/0061075 A1* | 3/2009 | Ruglio et al. | 427/10 |
| 2010/0110451 A1 | 5/2010 | Biswas et al. | |
| 2010/0117859 A1 | 5/2010 | Mitchell et al. | |

FOREIGN PATENT DOCUMENTS

| | | |
|---|---|---|
| DE | 4425187 A1 | 1/1996 |
| WO | 2006116841 A1 | 11/2006 |

* cited by examiner

*Primary Examiner* — Timothy Meeks
*Assistant Examiner* — Michael P Rodriguez
(74) *Attorney, Agent, or Firm* — Barlow, Josephs & Holmes, Ltd.

(57) ABSTRACT

A method for measuring the thickness of a coating on a component section of a rotating component, wherein a heat expansion of the component section is determined by detecting a component core temperature and an actual coating thickness is produced, a device for conducting a method of this type having a temperature detecting system and having an evaluating device, as well as a production process and a coating system, are disclosed.

7 Claims, 2 Drawing Sheets

MEASUREMENT METHOD AND DEVICE FOR MEASURING LAYER THICKNESSES AS WELL AS PRODUCTION METHOD AND COATING SYSTEM

BACKGROUND OF THE INVENTION

The invention relates to a method for measuring the thickness of a coating on a component section of a rotating component during a coating process, a device for conducting a method of this type, a method for producing a component as well as a coating system.

The application of sprayed layers is associated with specific uncertainties and irregularities due to the jet spray of particles that can be influenced only in a limited way, so that reproducibility with respect to layer distribution and dimensional accuracy is very limited or is feasible only with correspondingly high tolerances. Therefore, in order to obtain a required coating thickness, an abrading post-processing such as a grinding or sanding is frequently necessary.

In the meantime, 3D-measurement systems for aligning the spray nozzle prior to each spray process are known, by means of which the reproducibility of the layer distribution is clearly increased and by means of which corrective measures are possible with respect to the spray angle, which, in conjunction with the component geometry, decisively determines the uniformity of layer application. The prerequisite for optimal alignment and control of the spray nozzle, however, is the regular inspection of each layer with respect to its thickness during the coating process and thus in real time.

A known measurement method for measuring layer thicknesses and a known measurement device are shown in DE 10 2005 009 262 A1. A sensor detects its distance from the component surface and a sensor detects its distance from the layer surface. The actual layer thickness is then measured from the difference between the two distance values.

In the German Patent Application DE 10 2006 052 587 A1 of the Applicant, a measurement method and a measurement device having three sensors is presented, which is based on a principle similar to the method or the device according to the above-named DE 10 2005 009 262 A1. In this case, the third sensor monitors the position of one of the two sensors relative to the component and detects the position of the component at specific time points. This makes possible certain information of which region the monitored sensor is measuring, so that the layer distribution can be precisely determined.

A method and a device for measuring the layer thickness of a rotating component having only one optical sensor are presented in WO 2006/116841 A1. The component rotates around its longitudinal axis and is coated via a spray nozzle traveling along the longitudinal axis, whereby the layer is applied in a spiraling strip. For detecting the layer thickness, a camera is provided, which detects the movement of a laser beam scanning the surface of the coating, so that the layer thickness can be determined basically via the step formation in the edge region between two strips.

A measurement method and a measurement device for measuring the layer thickness of a rotating component having only one optical sensor are also known from U.S. Pat. No. 6,832,577 B2. At the beginning of the coating process, a required quantity of powder is determined. The component is then positioned in a field by parallel laser beams lying in a plane. During coating, a beam shadow imaging the outer contour of the component is formed, and the width of this shadow increases with increasing layer thickness. The component is also detected optically by the optical sensor and a plurality of single images of the changing outer contour are prepared. After spraying a specific quantity of powder, the coating process is interrupted and the layer application is evaluated taking into consideration the quantity of powder sprayed, the beam shadow and the single images.

It is problematical, however, that a heat expansion of the component during the coating is not considered. For a precise determination of layer thickness, however, exact knowledge of the component core temperature is essential, since a radial heat expansion of the component frequently is found of the same order of magnitude as a common targeted layer thickness. In fact, it is known from US 2009/0061075 A1 to monitor the temperature by means of a pyrometer directed on the coating, but this temperature only records the surface temperature of the last layer produced. This problem is intensified if the component is cooled on the side of the outer periphery during the coating process.

SUMMARY OF THE INVENTION

The problem of the invention is to create a method and a device for measuring the thickness of a coating on a component section of a rotating component during a coating process, which eliminate the above-named disadvantages and make possible a consideration of a component core temperature. In addition, it is the problem of the invention to create a method for producing a component and a coating system performing a layer thickness measurement during a coating process.

In a method according to the invention for measuring the thickness of a coating of a rotating component during a coating process, a component temperature is detected on a section of the component surface on the back of the component surface. Then a heat expansion of a component section forming the coating surface and the component surface section is determined taking into consideration the detected temperature of the component. After this, the coating thickness is determined taking into consideration the heat expansion of the component section.

The method according to the invention permits the actual and highly precise measurement of individual layer thicknesses as well as the thickness of a coating that is composed of the layers, since the heat expansion of the component section that is to be processed is taken into consideration for the layer thickness measurement or the coating thickness measurement. The heat expansion is not determined on the basis of an outer surface layer temperature, however, but on the basis of a component temperature acting as a component core temperature in the component. All thermal influences acting on the component are reflected in this component core temperature, so that a surface cooling of the component is also automatically taken into consideration.

The component temperature can be continuously detected or can be detected at a defined angle of rotation or at a defined time point, a so-called triggering point.

In order to be able to carry out a particularly precise determination of the component temperature, in one example of embodiment, the component temperature is detected at several sections of the component surface and the component core temperature is then averaged from the local component temperatures that have been detected.

In one method, a single photographic image of at least one surface region of the component section is prepared prior to application of a layer of the coating. Then a single photographic image of the surface region is prepared after applying the layer, and the coating thickness is determined taking into consideration the heat expansion of the component section.

In order to be able to equilibrate or compensate for movement deviations such as tumbling motions of the rotating component during measurement, each of the single photographic images is prepared at least at a constant angle of rotation. A layer thickness determination is possible even with a single image per revolution. However, since only a locally greatly limited surface region of a coating surface of the component section is detected in this way, it is preferable if several single images, in particular 3 to 6 photos, are prepared per revolution, each taken at a constant angle of rotation. The more single images are prepared per revolution, the more accurately the course of the layers can be determined. In an alternative example of embodiment, the component section is photographed completely, i.e., the component section is filmed during a 360° revolution of the component. In this case, there is no gap in the component section, which makes possible a very detailed thickness analysis of the individual layers or of the coating.

A change in the layer thickness or coating thickness can be tracked in different ways. In one example of embodiment, a point laser triangulation is conducted. For this purpose a light beam is directed onto the surface region of the component section that is found in the focus of the camera, and, based on a change in position of a reflection point or a point-type reflection pattern that is reflected on the surface region relative to the camera, an increase in thickness is observed. In another example of embodiment, a line laser triangulation is conducted, in which a light strip or fanned-out light beam is directed onto a surface region of the component section found in the focus of the camera and then a reflection line emerges as a reflection pattern.

In an alternative example of embodiment, in order to track a change in the layer thickness or the coating thickness, a shadow image or silhouette analysis is conducted. In this case, the surface region of the component section found in the focus of the camera is back-illuminated and the thickness increase is observed by a change in the shadow patterns or silhouettes imaged in this way.

A preferred device for conducting a method according to the invention has a temperature detecting system with at least one heat sensor for determining the component temperature on a back-side component surface section and an evaluating device for determining the layer thickness taking into consideration a heat expansion of the component section.

The at least one heat sensor is most preferably configured so that it is torsionally rigid and can be fastened to the component and is provided with a wireless unit for transmitting the detected component temperature to the evaluating device. The wireless unit is advantageous, insofar as a wired solution is essentially more expensive than a wireless solution in the case of a sensor that rotates along with the component.

In order to more precisely perform the temperature measurement, a plurality of wireless heat sensors of this type can be provided.

In order to carry out a laser triangulation, the measurement device may have a light source for generating a reflection point or a reflection strip onto the surface region of the component section found in the focus of the camera.

For conducting a silhouette analysis, the measurement device may have a light source for the background illumination of the surface region of the component section found in the focus of the camera.

A triggering system can be provided for regular data collection, i.e., for transmitting a temperature and preparing an optical photograph for a given angle of rotation or a given time. In particular with respect to the optical photograph, a compensation system for equilibrating tumbling movements of the component can be dispensed with. Alternatively, however, a compensation system can be provided.

A preferred method for producing a component is provided by the application of the method according to the invention and/or by the use of the device according to the invention, which permits the production of coatings with highly precise dimensions. In this way, time-consuming and costly grinding post-treatments for maintaining tolerance requirements will be eliminated.

A preferred coating system for conducting a production process of this type has at least one measurement device according to the invention.

Other advantageous embodiment examples of the invention are the subject of additional subclaims.

BRIEF DESCRIPTION OF THE DRAWINGS

Preferred examples of embodiment of the invention will be explained in more detail in the following on the basis of very simplified schematic representations. Herein.

DETAILED DESCRIPTION OF THE INVENTION

Figure 1:
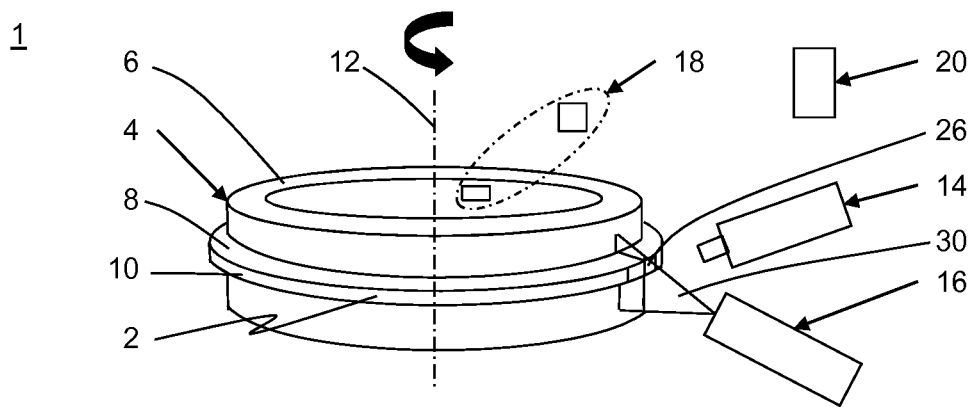
FIG. 1 shows a first example of embodiment of a measurement device according to the invention.

FIG. 1 shows a first example of embodiment of a preferred measurement device 1 according to the invention for measuring the thickness of a coating 2 composed of at least one layer 3, 5 (FIG. 2) during a coating process of a rotationally symmetrical component 4. Component 4 is clamped in a rotating mechanism of a coating system (not shown), which has, in addition to the rotating mechanism, a spray gun with an adjustable spray angle and an adjustable spray rate. Component 4 has an annular basic body 6 with a radial collar 8 running in the peripheral direction and the outer peripheral surface 10 of this collar is to be provided with coating 2. For example, component 4 is a rotor ring of a turbomachine, such as an aircraft engine with at least one radial sealing piece formed by radial collar 8. Component 4 is clamped loosely in the rotating mechanism (not shown) and executes a rotation around its axis of rotation 12.

Figure 2:
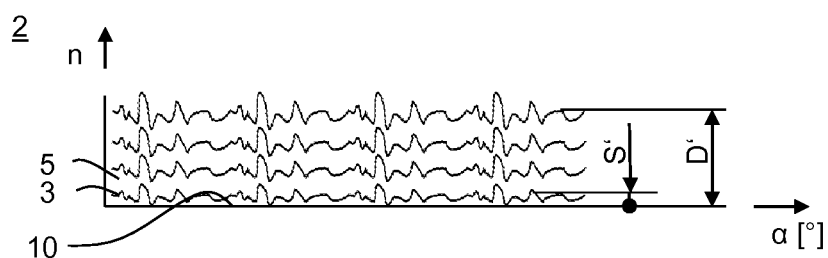
FIG. 2 shows a structure of a coating.

Coating 2 is composed of a plurality of layers 3, 5, each of which is applied onto the outer peripheral surface 10 of radial collar 8 during one revolution, as shown in greatly simplified manner in FIG. 2. The number n of layers 3, 5 corresponds to the number of revolutions. The Greek letter α symbolizes the angle of rotation of component 4. The respective layer is applied by means of the spray gun in a layer thickness S and may vary between layers 3, 5. Layers 3, 5 may have irregularities such as elevations and depressions, which can be equilibrated by appropriate corrective measures such as a modified control of the spray gun during the coating process. The sum of the layer thicknesses S gives the coating thickness D. When only one layer is applied, the equation S=D is valid.

Measurement device 1 according to FIG. 1 comprises an optical sensor 14 in the form of a camera or a photo apparatus, a triggering system (not shown), a light source 16, a temperature detecting system 18, as well as an evaluating device 20.

Figure 3:
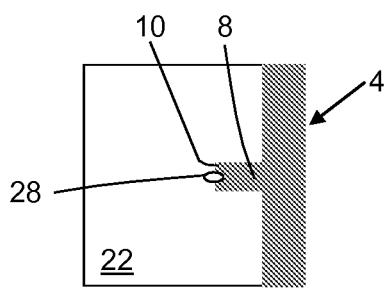
FIG. 3 shows a laser triangulation image before coating a component section.
Figure 4:
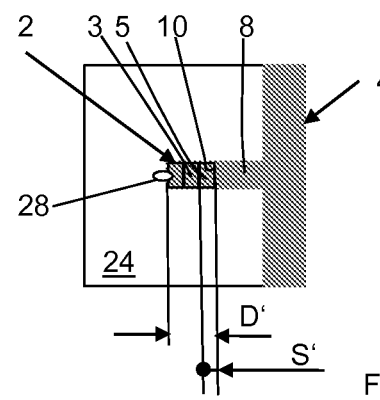
FIG. 4 shows a laser triangulation image after coating the component section.

Camera 14 is disposed in a stationary manner relative to rotating component 4 and serves for preparing single photographic images 22, 24 shown in FIGS. 3 and 4 of at least one surface region 26 of outer peripheral surface 10.

The triggering system has a tachometer and/or a timer and effects a triggering of camera 14 at specific repeating angles of rotation a of component 4. In this way, the same local surface regions 26 are regularly photographed from the same camera perspective.

Light source 16 is a stationary line laser, for example, and serves for generating a reflection point 28 shown in FIGS. 3 and 4 onto the respective surface region 26 for conducting a laser triangulation. The reflection point or the reflection line 28 is formed by a reflection of laser beam 30 on surface region 26. With each layer application, it changes its position relative to camera 14. Whereas reflection point 28 is imaged directly on the uncoated outer peripheral surface 10 prior to the beginning of the coating process, as shown in the single photograph 22 according to FIG. 3, reflection point 28 is moved radially outwardly and thus away from the outer peripheral surface 10 by coating 2 for each layer application, as shown in the single photograph 24 according to FIG. 4. At the end of the coating process, the distance between reflection points 28 before and after the coating process corresponds to the sum of the layer thicknesses S of layers 3, 5 and thus to a coating thickness D. Since the layer thickness S and the coating thickness D are given in pixels in the single photographs and are thus output as S', D', they are to be calculated for output in a metric unit of measure corresponding to the relationships S'=S*k and D'=D/*k, with k as a scale correction factor k.

Figure 5:
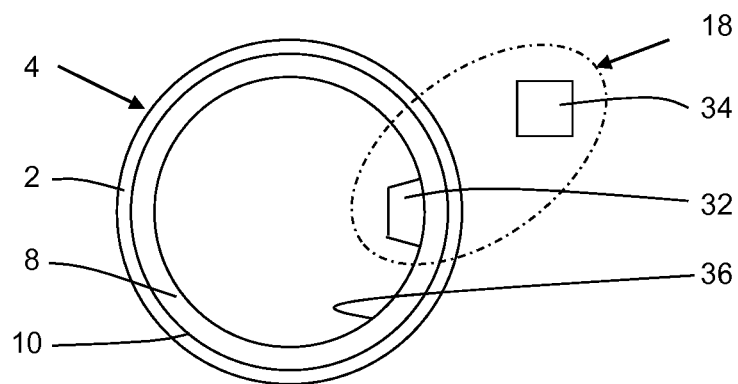
FIG. 5 shows a temperature measurement during the coating.

Temperature detecting system 18 serves for determining a component core temperature. As shown in very simplified manner in FIG. 5, it comprises a heat sensor 32 having a wireless unit and a receiving unit 34. The so-called wireless sensor 32 is positioned in a torsionally rigid manner on the back in the direct vicinity (relative to coating 2 that is on the side of the outer periphery) of a component surface section 36 of component 4 that is on the side of the inner periphery. For example, it is inserted in form-fitting manner into a corresponding inner-peripheral groove or the like. It is found in the direct vicinity of coating 2 and transmits its measurement data via wireless to receiving unit 34 that communicates with evaluating device 20 and is disposed on the side of the outer periphery or on the coating side.

Evaluating device 20 determines the respective layer thickness S as well as the actual coating thickness $\Delta D$ from the single images 22, 24 and the component core temperature, so that by interacting with the machine control of the coating system, corrective measures such as a modified control of the spray gun can be conducted if intolerable deviations should occur.

Figure 6:
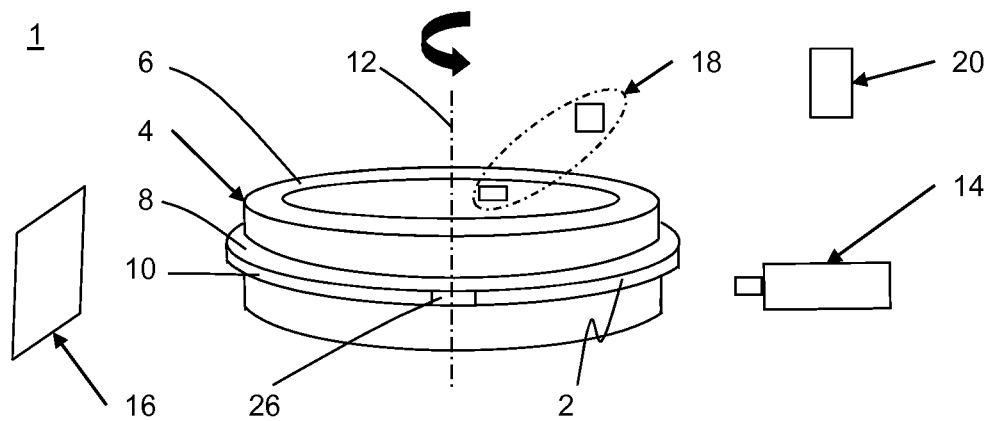
FIG. 6 shows a second example of embodiment of the measurement device according to the invention.

FIG. 6 shows a second preferred example of embodiment of a measurement device 1 according to the invention for measuring the thickness of a coating 2 composed of at least one layer during a coating process of a radial collar 8 of a rotationally symmetrical component 4.

Measurement device 1 comprises an optical sensor 14 in the form of a camera or a photo apparatus, a triggering system (not shown), a light source 16, a temperature detecting system 18, as well as an evaluating device 20. Camera 14, the triggering system, temperature detecting system 18 as well as evaluating device 20 according to the second example of embodiment are unchanged when compared with the first example of embodiment. Unlike the first example of embodiment according to FIG. 1, however, there is no laser triangulation in the case of the second example of embodiment, but rather a silhouette image analysis is conducted for detecting a respective layer thickness S as well as for determining the required coating thickness D. Consideration of a scale correction factor k is not necessary in the case of the silhouette image analysis.

Figure 7:
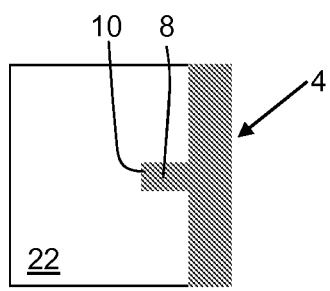
FIG. 7 shows a silhouette image prior to coating a component section.
Figure 8:
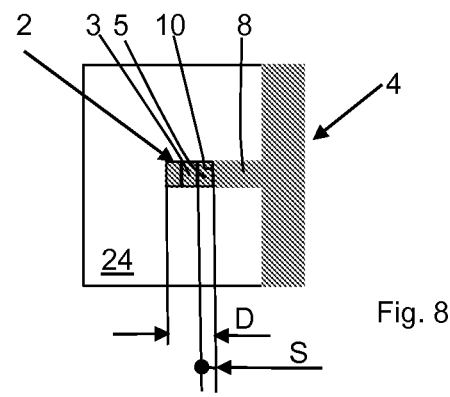
FIG. 8 shows a silhouette image after coating the component section.

For this purpose, camera 14 is directed tangentially onto the surface region 26 of component 4 to be coated, which is back-illuminated by means of light source 16 acting as background illumination. As shown in the single images 22, 24 in FIGS. 7 and 8 before and after a coating process, in the case of the silhouette image analysis, the back-illuminated section of radial collar 8 is shown as a shadow or silhouette. Likewise, each layer 3, 5 and thus coating 2 is imaged as a silhouette. A change in the respective layer thickness S or coating thickness D is observed each time by means of a comparison of the respective silhouette images or single images 22, 24, coating 2 having the predetermined thickness D at the end of the coating process.

An example of embodiment of a measurement method according to the invention for measuring the thickness of a coating 2 composed of at least one layer during a coating process of an outer peripheral surface 10 of a radial collar 8 of a rotationally symmetrical component 4 will be explained in the following. Component 4 is clamped in the rotating mechanism of the spraying system and placed in rotation. Camera 14 as well as light source 16 are controlled and 6 single images 22 are prepared from the uncoated outer peripheral surface 10 at specific angles of rotation $\alpha$. After one revolution of component 4, the spray gun is controlled and a layer 3 is applied to the outer peripheral surface 10. At the same time as the application of layer 3, 6 single images 24 are prepared at the previously given angles of rotation $\alpha$. Also, the component core temperature is detected via the at least one wireless sensor 32 fastened to component 4 on the side of its inner periphery, and this temperature is sent via wireless to the outer-lying receiving unit 34, which then determines the heat expansion of radial collar 8 based on the detected component core temperature. Then the single photos 22, 24 (reflection images or silhouette images) before the respective layer application are compared with the single images after each layer application, and the actual coating thickness $\Delta D$ or the layer thickness S is determined taking into consideration the heat expansion. The steps: Preparation of single images, determination of component temperature, determination of heat expansion of radial collar 8 to be coated and determination of the coating thickness D or layer thickness S based on a comparison of single images 22, 24 and taking into consideration the heat expansion—are repeated until all layers 3, 5 for the preparation of coating 2 have been applied or until coating 2 has its required thickness D.

In the case of a coating method according to the invention, a thickness measurement of coating 2 or its layers 3, 5 is carried out by applying the measurement method according to the invention. If necessary, based on the measurement results, and thus in real time, corrective measures, such as a change in the spray angle or a change in the spray rate during the coating process or between the application of two layers 3, 5, are carried out.

A method for measuring the thickness of a coating on a component section of a rotating component, wherein a heat expansion of the component section is determined by detection of a component core temperature and an actual coating thickness is produced, a device for conducting a method of this type having a temperature detecting system and an evaluating device, as well as a production process and a coating system are disclosed.

What is claimed is:

1. A method for measuring the thickness of a coating (2) of a rotating component (4) during a coating process, comprising the steps of:
- providing a component comprising a component surface section and a coating surface section the component surface section and the coating surface section being on opposite sides of the component;
- detecting a component temperature at the component surface section (36);
- determining a heat expansion of a component section (8) forming the coating surface section (10) taking into consideration the detected component temperature; and
- determining a coating thickness (D) on the coating surface taking into consideration the heat expansion of component section (8).

2. The method according to claim 1, wherein the component temperature is detected continuously or at a defined angle of rotation ($\alpha$).

3. The method according to claim 1, wherein a component temperature is determined for each of at least two component surface sections (36) and the component temperature is averaged therefrom.

4. The method according to claim 1, further comprising the steps of:
- preparing a single photographic image (22) of at least one surface region (26) of component section (8) prior to an application of a layer (3, 5) of coating (2);
- preparing a single photographic image (24) of surface region (26) after applying the layer; and
- determining the coating thickness (D) based on a comparison of the single images (22, 24) and taking into consideration the heat expansion of component section (8).

5. The method according to claim 4, wherein a plurality of single photographic images (22, 24) are prepared at defined angles of rotation ($\alpha$).

6. The method according to claim 4, wherein a light beam is directed onto surface region (26) and a layer thickness increase ($\Delta D$) is observed based on a reflection image (28) reflected on surface region (26).

7. The method according to claim 4, wherein surface region (26) is reflected as a silhouette image.

* * * * *